(12) United States Patent
Dacloush et al.

(10) Patent No.: US 6,700,961 B1
(45) Date of Patent: Mar. 2, 2004

(54) PREPAID CALLING WITH WARNING ANNOUNCEMENT

(75) Inventors: Elias Joseph Dacloush, Naperville, IL (US); Puneet Gupta, Milpitas, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/631,513

(22) Filed: Aug. 3, 2000

(51) Int. Cl.[7] .............................................. H04M 15/00
(52) U.S. Cl. ............................. 379/114.2; 379/114.16; 379/114.17; 379/114.28
(58) Field of Search ..................... 379/144.01, 144.07, 379/114.2, 114.15, 114.16, 114.17, 114.28, 114.26, 121.01, 121.03, 127.03, 127.05

(56) References Cited

U.S. PATENT DOCUMENTS

| | | | | |
|---|---|---|---|---|
| 4,706,275 A | * | 11/1987 | Kamil | ..................... 379/114.2 |
| 5,825,863 A | * | 10/1998 | Walker | ..................... 379/114.2 |
| 5,864,609 A | * | 1/1999 | Cross et al. | |
| 6,009,156 A | * | 12/1999 | Cross | |
| 6,122,354 A | * | 9/2000 | Dowens | |
| 6,137,872 A | * | 10/2000 | Davitt et al. | |
| 6,226,364 B1 | * | 5/2001 | O'Neil | ..................... 379/114.2 |

* cited by examiner

Primary Examiner—Curtis Kuntz
Assistant Examiner—Barry W Taylor
(74) Attorney, Agent, or Firm—Fitch, Even, Tabin & Flannery

(57) ABSTRACT

A method and arrangement for providing prepaid calling card services to a calling party is disclosed. Near the end of value of a prepaid calling card account, the calling and called parties to a connection are split and the calling party is given the opportunity to increase the value of his or her prepaid calling card account. If the account is increased the call continues using the increased value. Alternatively, if the account is not increased the connection is dropped.

16 Claims, 3 Drawing Sheets

PREPAID CALLING WITH WARNING ANNOUNCEMENT

BACKGROUND OF THE INVENTION

This invention relates to Intelligent Network Telecommunications and particularly to calling card services via such a network.

Calling card services are used in telecommunication systems primarily as a means to affect the billing for services. For example, a standard calling card may be used to change the party or account charged for the cost of a telephone call. Usually the change involves actually charging and billing an account represented by the calling card rather than an account represented by the calling telephone. Debit or prepaid calling cards may also be used to pay for telecommunication services. With a prepaid calling card the user prepays an amount of money to establish a card balance and as services are used the balance is decreased. When the balance becomes zero or less than the cost of a requested service the service is not provided or, if ongoing, it is terminated. When the service being provided is a telephone connection between parties the expiration of the prepaid calling card balance results in the termination of the connection. A need exists in the art for an improved manner of providing services from a prepaid calling card and particularly in the manner of terminating prepaid calling card services.

SUMMARY OF THE INVENTION

A system and method in accordance with the present invention announces the expected termination of a prepaid calling card before call termination. As such, the call originator and call terminator have the opportunity to close a conversation before the call connection is dropped. Additionally, and advantageously, the call originator may be given the opportunity to change the billing account for the call so that the conversation can continue based on a new prepaid amount. In accordance with the embodiments, the change of billing may result in changing billing from one prepaid calling card account to another or it may result in adding value to an existing prepaid account by means such as a credit card.

As described herein the parties to a prepaid calling card account are not just cut off when the prepaid amount is used up but the connection between the parties is split and a call originator is given the opportunity to change the prepaid amount available to continue the connection.

A method as described later herein comprises establishing in an Intelligent Telecommunication Network, a value identifying a prepaid amount for telephone services, establishing a connection between a call originator and a call terminator and timing a connection established. When the timing represents that the value has, or nearly has, been used up to pay for the connection, the connection is split and a warning tone or announcement is delivered to the call originator. Such a warning tone or announcement may also be delivered to the call terminator. Advantageously, the call originator may be given the opportunity to add value to the prepaid account by means of a credit card or by changing the billing account to another prepaid calling card.

Such conveniences are provided in a system comprising a service switching point of the call originator and a service control point of the telecommunication Intelligent Network. The service switching point collects digits necessary to identify the call terminator and to associate the call with a prepaid account against which the call is to be charged. The service control point receives the digits from the service switching point, associates the proper account with the requested connection and begins to time the connection against the associated prepaid account. When the account is used up (its value becomes 0) or nearly so, the service control point directs the service switching point to split the existing connection, connect a digit receiver and play an announcement to the call originator. The call originator may then dial digits defining another prepaid account against which to charge the existing connection. The service switching point then receives the digits and forwards them to the service control point which, in response thereto, associates the another prepaid account with the connection and reestablishes the connection between call originator and call terminator. Alternatively, the call originator, upon receiving the announcement of expiring prepaid calling card may dial digits defining a credit card which should be charged to provide additional value to the existing prepaid calling card account. After adding value, the service control point directs the service switching point to reconnect the call originator and call terminator and times the connection against the augmented value of the prepaid card account.

When operating as herein described, call originators can avoid being abruptly cut off from ongoing communications and are given opportunities to extend the communication by providing an account of additional value against which the communication can be charged.

BRIEF DESCRIPTION OF THE DRAWINGS

A more complete understanding of the invention may be obtained from consideration of the following description in conjunction with the drawing, in which.

DESCRIPTION

Figure 1:
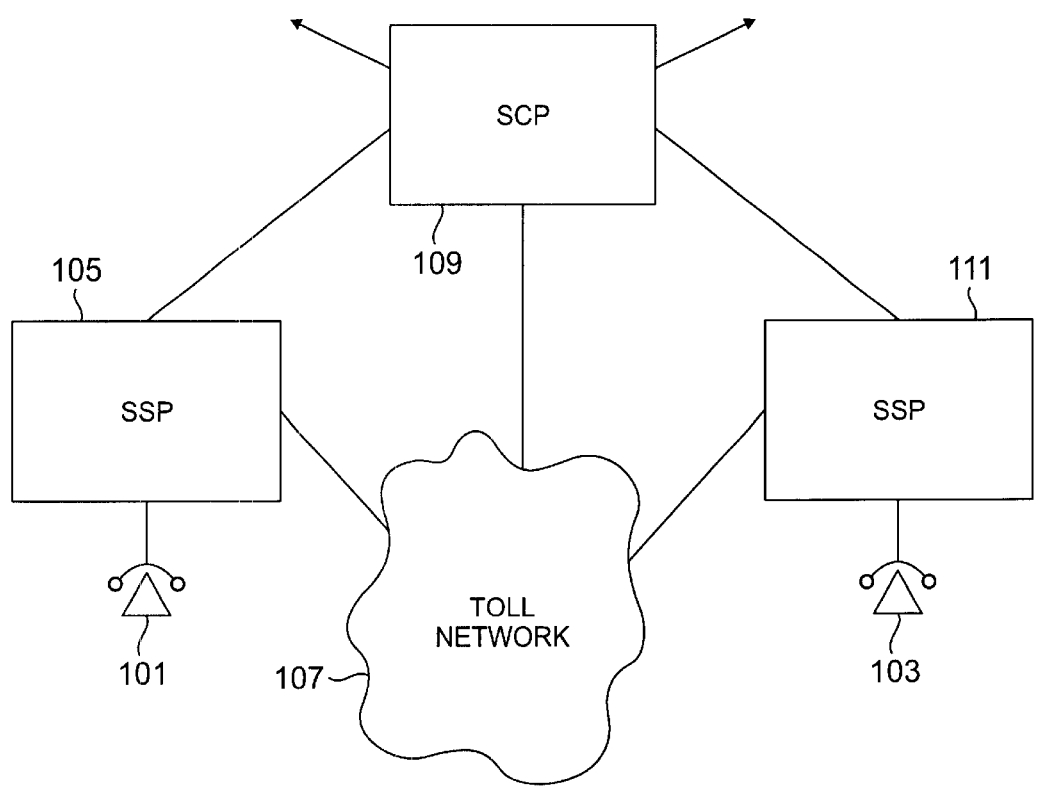
FIG. 1 is a block diagram representing a telecommunication Intelligent Network.

FIG. 1 is a block diagram representing a toll call between a call originator 101 and a call terminator 103. Call originator 101 is connected to a local telephone switch 105 which operates in the manner well known in the art to receive signaling from call originator 101, to provide announcements to call originator 101 and to provide basic telephone connection services to the call originator. Telephone switch 105 is sometimes referred to as a service switch point or SSP. Telephone switch 105, which may for example be a No. 5ESS, is also connected to a toll network 107 and to one or more service control points (SCP) represented by SCP 109 which is also connected to the toll network 107 and other service switching points such as 111 which provide telephone service to the other subscribers such as call terminator 103.

In FIG. 1, SCP 109 represents the intelligence and stored data of the Intelligent Network. The service control point 109 includes program and data which assist the SSPs 105 and 111 in providing extended services to the subscribers connected to them. For example, when call originator 101 wants to connect to call terminator 103, the originator sends calling digits identifying the call terminator 103 to the SSP 105 which collects the digits and interprets them as defining a toll call. SSP 105 then forwards the collected digits to the Intelligent Network SCP 109 and requests a connection to the party identified by the collected digits. The SCP 109 identifies a path through the toll network 107 between SSP 105 and SSP 111 and notifies SSPs of the expected connection to call between call originator 101 and terminator 103. SSP 111 responds to the possible connection by checking the status of call terminator 103. If call terminator 103 is in use, SSP 111 notifies the SCP 109 which, in turn, notifies SSP 105 that call terminator 103 is in use. SSP 105 then sends the well known busy signal to call originator 101. When the call terminator 103 is not in use SSP 111 sends a ringing signal to it and notifies SSP 103 of the ringing via SCP 109. When call terminator 103 is not answered the ringing signals continue until call originator 101 hangs up. At hang-up the SCP 109 and SSP 111 are notified, all signaling stops and the identified toll network path is released for use by other connections. Alternatively, when call terminator answers the SCP 109 is notified and control signals are sent to the toll network 107 and SSP 105 to complete the talking connection between the call originator 101 and the call terminator 103. Both SSP 105 and SSP 111 monitor the status of the connection and when either call originator 101 or the call terminator 103 go on hook notice is sent to the SCP 109 which directs SSP 105, SSP 111 and toll network to drop the connection.

The network intelligence of the SCP 109 is also used to accumulate information from which subscriber billing can be created. The SCP 109 includes data representing the cost of calling for a plurality of subscribers such as call originator 101. When an originator paid toll call is placed, the SCP 109 computes the cost per time of the call for the originator and then times the duration of the call. At call completion, a value is stored in a file associated with the call originator and representing the total cost of the recently completed call as well as other prior calls billed to the call originator.

Other types of call payment are also administered by the SCP 109. For example, prepaid debit cards or calling cards are available which can be purchased for predetermined dollar amounts. Such prepaid calling cards may be purchased for $10, $20, $50 or other value and may have a preset calling rate such as 10 cents or 15 cents per minute. The prepaid calling card does not in fact represent an amount of money available to the purchaser at the moment of use but instead represents the identity of an account stored in the telephone network. When a prepaid calling card is purchased, the selling party must first "validate" the card. The act of validation establishes a money value file (account) on an SCP of the intelligent network represented by SCP 109 in FIG. 1. That is, the value of services due to a purchaser of a prepaid card is represented by a data file in an SCP and not by the card itself. The card and codes printed thereon are used to associate the user of the card with the money valued data file.

When a call is placed using a prepaid calling card, the initial dialing of calling card digits associates the call with a particular money valued data file of the Intelligent Network as represented by SCP 109. The call is completed normally, however, instead of accumulating costs to be charged later to the user, the ongoing costs of the connection are "subtracted" from the value of the associated data file until the data file represents no more value. At this point, the connection associated with the call is dropped and no readily available arrangement of continuing the connection exists.

Figure 2:
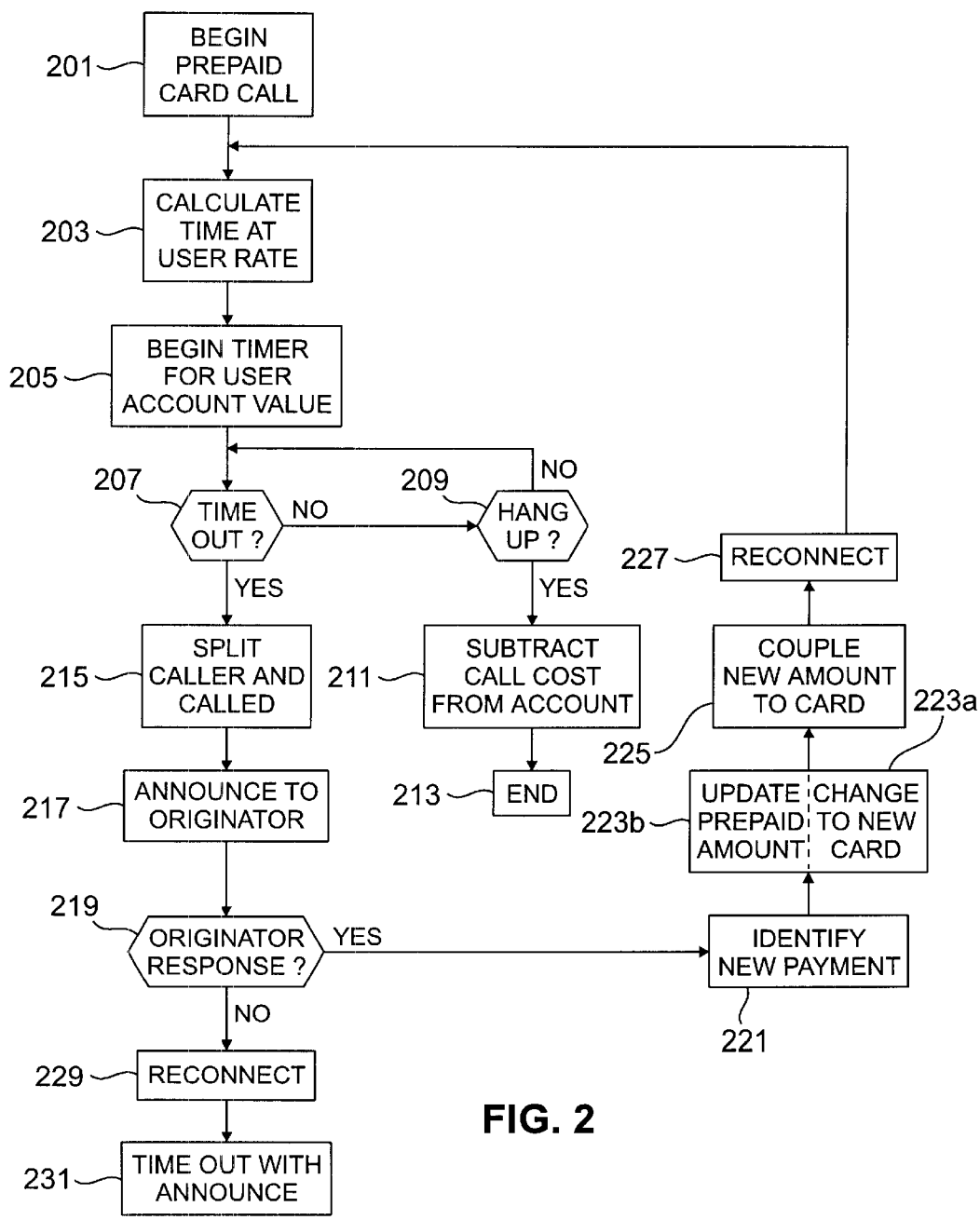
FIG. 2 is a flow diagram of a prepaid calling card service with warning announcement.

FIG. 2 is a flow diagram representing the interaction between an SSP 105 of a call originator 101 and an intelligent network SCP 109 in the completion of a prepaid calling card call. The flow begins with a block 201 which represents the steps necessary to establish a prepaid calling card call based on an account value stored in SCP 109. The processes of block 201 are well known in the art and are not described further herein. When the call connection is completed the cost per unit time is known and the SCP 109 computes in block 203 a total time available based on the value of the prepaid account. A timer is then started in block 205 for a period of time equal to or somewhat shorter than the maximum calculated time. In the present example, the timer is set to a time 20 seconds short of the maximum time. A step 207 is then repetitively performed to determine whether the time has timed out. Additionally, a block 209 is performed while the timer is running to identify if one or more of the parties have gone on hook or the connection has been otherwise disconnected. When a disconnect is deleted in block 209 the process continues by calculating in block 211 the cost of the call up the disconnect and subtracting that cost from the prepaid account associated for the current call with the call originator 101. After step 211 the billing is ended and the adjusted account value is available for a subsequent connection. In the preceding description the timer and disconnect detection were shown performed as process loops. Other methods may also be used such as hardware or software timers and disconnect identifiers which interrupt or otherwise notify a call process upon the occurrence of an event.

When a time out is detected in block 207 indicating that the calling card amount is near zero, a block 215 is performed to split the call originator 101 and call terminator 103 connection in SSP 105 and a tone or other announcement is played in block 217 by SSP 105 to call originator 101. Advantageously, the call terminator 103 is kept on hold. The tone or announcement in block 217 calls for a response from the call originator 101 to provide new prepayment value against which future parts of the connection (or subsequent connections) may be charged. In the present example, a simple distinct tone is played to which a knowledgeable user responds by pressing the pound (#) key, or any other predetermined key, if alternative payment is to be made. The pound key press is detected in block 219 and flow proceeds to block 221 to identify a source of new prepayment value. An announcement may be played in block 221 in response to the pound key to guide the user through the options for providing new payment value. In one option 223a, the call originator provides the identify of another prepaid calling card account which is to be substituted for the about-to-expire account. Alternatively (223b), the call originator may provide a credit card number and an amount of money by which to increase the existing prepaid calling card account. After either block 223a or 223b has been accepted flow proceeds to block 225 where the connection in progress is coupled to the new prepaid value account for continued payment. The flow then returns to block 203 where a timer is set based on the new value and the call continues as before. When the call originator does not respond to the tone (announcement) of block 217, flow proceeds from block 219 to block 229 where the parties are reconnected for the approximately 20 seconds remaining on the original prepaid calling card account. At the end of the short reconnect period the timer times out and the call is terminated with an announcement in block 231.

Figure 3:
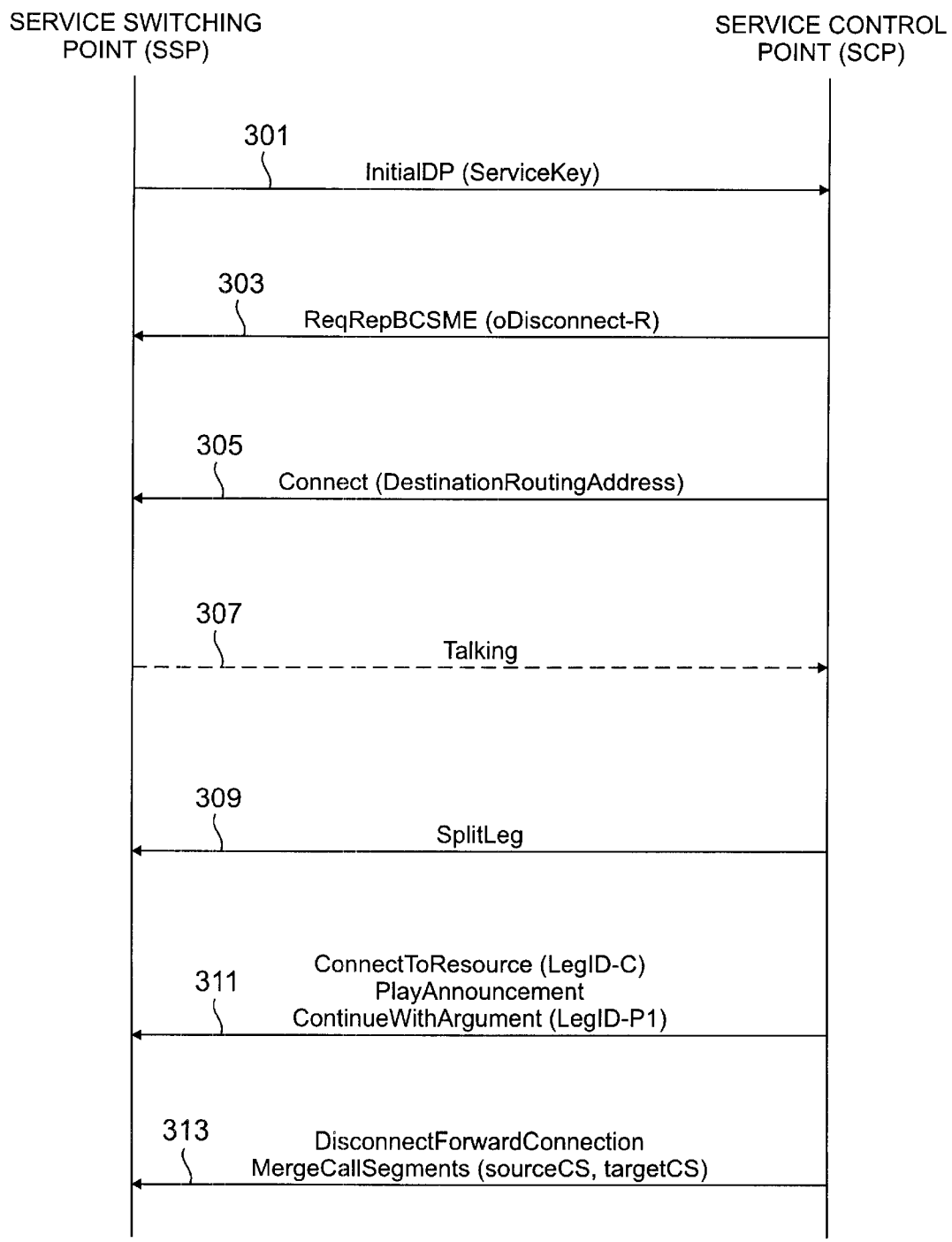
FIG. 3 shows a message sequence for an embodiment.

FIG. 3 illustrates an embodiment of warning tone service using Intelligent Network Application Party Capability Set 2. FIG. 3 is arranged as a message sequence "ladder" to show the messages flowing between SSP 105 and SCP 109 to implement the intelligent network service. The first three messages represented at lines 301, 303 and 305 consist of Initial DP service key (Initial Detection Point), Req Rep BCSME oDisconnect-R (Request Report Basic Call State Machine), and connection (Destination Routing Address) use the expected messages for setting up the stable two-party talking path represented at 307. It is assumed that EDP (Event Detection Point)-9B is armed for the stable call.

When the prepaid billing timer in SCP 109 times out (block 207, FIG. 2) SplitLeg operation is sent (309) to the SSP 105 directing that the stable call be split and that the passive party, i.e., call terminator 103, be placed on hold. The splitting of the parties puts the connection from the SSP 105 to the call originator 101 in call segment 1 (CS1) and the connection from SSP 105 to the call terminator 103 in call segment 2 (CS2). While the split state continues, a CTR (Connect to Resource), PACUI (Prompt and Collect User Info) and PA (Play Announcement) are sent 311 to call segment 1 to notify and to collect new billing information from the call originator. If it is desired to advise the call terminator 103 of the call status, a CTR and PA may also be sent to call segment 2 to provide the announcement. Once the call originator digits have been collected and a proper prepaid billing account established for the call, a Merge Call Segments operation (313) identifying both the originating caller and the terminating caller is sent to SSP 109. In response to the Merge Call Segments operation, the parties are rejoined to continue with a stable talking path.

It is understood that the above described embodiments are merely descriptive of the principles of the invention and that many variations may be devised by those skilled in the art without departing form the scope of the invention. It is intended that such variations be included within the scope of the claims.

What is claimed is:

1. A method of providing prepaid telephone service using a prepaid telephone card in a telephone system comprising a local telephone switch and an intelligent network control point, the method comprising:

storing in the control point a value identifying a prepaid amount for telephone services;

establishing a communication connection between a call originator and a call terminator;

timing by the control point the duration of the communication connection to a first duration less than the duration represented by the prepaid amount;

providing a warning tone to the originator based on the timed duration of the communication connection by splitting the connection between the call originator and the call terminator, and transmitting a warning tone to the call originator;

updating the prepaid amount based on originator interaction by receiving information from the call originator identifying another prepaid account stored in the control point; and restarting the timing based on the updated prepaid account.

2. A method in accordance with claim 1 comprising delivering an announcement to the call originator directing prepaid amount increase options.

3. A method in accordance with claim 1 comprising:

placing the call terminator in a hold state while the connection is split.

4. A method in accordance with claim 3 comprising delivering an announcement to the call terminator while in the h old state.

5. A method in accordance with claim 1 comprising timing the duration of the communication connection based upon the another prepaid amount.

6. A method in accordance with claim 1 wherein the updating of the prepaid amount comprises receiving a direction from the call originator to increase the amount of prepaid telephone service.

7. A method in accordance with claim 6 comprising timing the duration of the communication based on the increased amount for telephone services.

8. A method in accordance with claim 6 wherein the direction received from the call originator comprises a credit card number.

9. A method in accordance with claim 6 wherein the direction received from the call originator comprises a debit card number.

10. A method of providing prepaid telephone service using a prepaid telephone card in a telephone system comprising a local telephone switch and an intelligent network control point, the method comprising:

storing in the control point at a location associated with a first prepaid account, a value identifying a first prepaid amount for telephone services;

establishing a communication connection between a call originator and a call terminator;

timing by the control point the duration of the communication connection to a first duration less than the duration represented by the first prepaid amount;

providing a warning tone to the originator based on the timed duration of the communication connection;

receiving from originator interaction, information identifying a second prepaid account, the second account having a value identifying a second prepaid amount; and restarting the timing based on the second prepaid account.

11. A method in accordance with claim 10 wherein the providing a warning tone comprises:

splitting the connection between the call originator and the call terminator; and transmitting a warning tone to the call originator.

12. A method in accordance with claim 11 comprising delivering an announcement to the call originator directing prepaid amount increase options.

13. A method in accordance with claim 11 comprising:

placing the call terminator in a hold state while the connection is split.

14. A method in accordance with claim 13 comprising delivering an announcement to the call terminator while in the hold state.

15. A method in accordance with claim 10 comprising timing the duration of the communication connection based upon the second prepaid amount.

16. A method in accordance with claim 10 wherein the identity of the second value comprises the identity of a prepaid calling card.

* * * * *